United States Patent
Alqam

(10) Patent No.: US 11,802,852 B2
(45) Date of Patent: Oct. 31, 2023

(54) TESTING METHODOLOGY TO MONITOR THE ON-SET OF SOLID ACID HYDROLYSIS USING SONIC WAVES

(71) Applicant: SAUDI ARABIAN OIL COMPANY, Dhahran (SA)

(72) Inventor: Mohammad H. Alqam, Dhahran (SA)

(73) Assignee: SAUDI ARABIAN OIL COMPANY, Dhahran (SA)

(*) Notice: Subject to any disclaimer, the term of this patent is extended or adjusted under 35 U.S.C. 154(b) by 367 days.

(21) Appl. No.: 16/911,686

(22) Filed: Jun. 25, 2020

(65) Prior Publication Data
US 2021/0404993 A1   Dec. 30, 2021

(51) Int. Cl.
G01N 29/22 (2006.01)
G01F 13/00 (2006.01)
G01N 29/07 (2006.01)

(52) U.S. Cl.
CPC ........... *G01N 29/227* (2013.01); *G01F 13/00* (2013.01); *G01N 29/07* (2013.01); *G01N 29/228* (2013.01); *G01N 2291/011* (2013.01); *G01N 2291/0252* (2013.01); *G01N 2291/0255* (2013.01)

(58) Field of Classification Search
CPC .... G01N 29/227; G01N 29/07; G01N 29/228; G01N 2291/011; G01N 2291/0252; G01N 2291/0255; G01F 13/00
USPC ......................................................... 436/34
See application file for complete search history.

(56) References Cited

U.S. PATENT DOCUMENTS

| 4,267,887 | A | | 5/1981 | Watanabe |
| 4,754,645 | A | * | 7/1988 | Piche .................... G01N 29/032 73/644 |
| 5,243,855 | A | * | 9/1993 | Stieger .................. G01N 29/07 73/152.52 |
| 5,905,036 | A | | 5/1999 | Pope et al. |
| 7,886,825 | B2 | * | 2/2011 | Van Hal ................ E21B 36/008 166/302 |

(Continued)

FOREIGN PATENT DOCUMENTS

| CN | 105221144 A | 1/2016 | |
| EP | 3754331 A1 * | 12/2020 | ........... G01N 29/045 |

OTHER PUBLICATIONS

Abass, . "Acid Fracturing or Proppant Fracturing in Carbonate Formation? A Rock Mechanic's View." Paper presented at the SPE Annual Technical Conference and Exhibition, San Antonio, Texas, USA, Sep. 2006. doi: https://doi.org/10.2118/10259 (Year: 2006).*

(Continued)

*Primary Examiner* — Peter J Macchiarolo
*Assistant Examiner* — Monica S Young
(74) *Attorney, Agent, or Firm* — Osha Bergman Watanabe & Burton LLP

(57) ABSTRACT

A method for testing solid acid hydrolysis in a formation. The method includes introducing a test sample into a test cell, where the test sample includes an upper structure, a lower structure, and a solid acid disposed between the upper and lower structures. The pressure and temperature of the test cell are increased to simulate downhole conditions. A velocity of an acoustic p-wave and/or acoustic s-wave is through the test sample is measured while the temperature is increasing from an initial temperature to a final temperature. A temperature of onset of solid acid hydrolysis based on the measured velocity is determined.

13 Claims, 3 Drawing Sheets

(56) References Cited

U.S. PATENT DOCUMENTS

| | | | |
|---|---|---|---|
| 11,187,677 B1* | 11/2021 | Cobb | G01N 29/2462 |
| 2001/0036667 A1 | 11/2001 | Tayebi et al. | |
| 2009/0014325 A1 | 1/2009 | Jones et al. | |
| 2009/0151938 A1 | 6/2009 | Conkle et al. | |
| 2010/0069266 A1* | 3/2010 | Battistel | C12N 9/2437 |
| | | | 507/101 |
| 2011/0012630 A1* | 1/2011 | Bevot | G01N 27/4065 |
| | | | 324/750.02 |
| 2011/0186293 A1 | 8/2011 | Gurmen et al. | |
| 2012/0024530 A1 | 2/2012 | Todd et al. | |
| 2013/0233536 A1* | 9/2013 | Alqam | G01N 3/00 |
| | | | 73/49.4 |
| 2015/0068292 A1* | 3/2015 | Su | G01N 3/46 |
| | | | 73/82 |
| 2016/0281454 A1 | 9/2016 | Zhu et al. | |
| 2018/0252082 A1 | 9/2018 | Zhu et al. | |
| 2018/0258757 A1 | 9/2018 | Werry et al. | |
| 2019/0055810 A1 | 2/2019 | Fripp et al. | |

OTHER PUBLICATIONS

Han Tielin, et al: "Laboratory investigation of the mode-I fracture of sandstone caused by a combination of freeze-thaw cycles and chemical solutions", Bulletin Of Engineering Geology and The Enviroment; vol. 79, No. 7; Mar. 12, 2020; pp. 3689-3706 (18 pages).

International Search Report and Written Opinion issued in Application No. PCT/US2020/057492, dated Mar. 9, 2021 (14 pages).

Nasr-El-Din, H.A. et al., "Acid Fracturing of Gas Wells Using an Acid Precursor in the Form of Solid Beads: Lessons Learned From First Field Application", SPE 110895, Society of Petroleum Engineers, Nov. 2007 (20 pages).

Rostami, Ameneh et al., "Optimization of a Solid-acid Precursor for Self-destructing Filter Cake", SPE 139087, Society of Petroleum Engineers, Oct. 2010 (12 pages).

* cited by examiner

TESTING METHODOLOGY TO MONITOR THE ON-SET OF SOLID ACID HYDROLYSIS USING SONIC WAVES

BACKGROUND

Hydraulic fracturing of a formation is used to create a conductive fracture in the pay zone to enhance well productivity. Typically, a fracture is initiated by injecting viscous fluid at a rate higher than what the matrix can accept based on Darcy's law. The pressure build-up due to the high rate of fluid flow fractures the formation, and high fluid injection rate continues as the fracture propagates deep in the reservoir. When injection is ceased, the induced fractures tend to close under the effect of in-situ minimum horizontal stresses. In proppant fracturing, a propping agent (proppant) is used to keep a fracture open, while in acid fracturing the etched, non-smooth, fracture surfaces would leave open pathways in addition to the wormholes and channels created perpendicular to the fracture plane into the formation.

Acid fracturing is widely used in the oil industry for stimulating both dolomite and carbonate formations to maximize oil and gas production. In a conventional acid treatment, 15-28% HCl is injected in a formation at a higher rate than the maximum Darcian flow of the formation. This will cause pressure build-up in the formation and consequently will cause the formation matrix to yield under pressure and start failing (fracturing). The continuous injection of the fracturing fluid will lead to the extension of the fracture. The injection of acid following the fracturing fluid will cause the acid to react with the formation and wormholes will be created. The wormholes formed will have an uneven fracture face, and will render the fracture open.

Acid fluid loss control has long been a problem in fracture acidizing. The most common techniques involve use of viscous pads or acid solutions. The main principle reason behind this operation is to place an impermeable filter cake on the fracture face and minimize wormholing. In practice, these filter cakes are relatively ineffective in controlling acid fluid loss because of the quick penetration by wormholes and the constant erosion of fracture faces during treatment. Fluids used in the fracture acidizing process (pad fluid, acid or additives) can be detrimental to well performance following the job. This can be due to clean up problems or a reduction in the formation permeability adjacent to the fracture.

Typically, acid fracture conductivity is decreased with increased closure stress and the fracture conductivity is not increased by increasing the amount of dissolved rock when closure stress is applied. Well performance may also be negatively impacted by undesirable wormholing and fluid viscosity increase such as by the formation of a plastic-like material caused by incomplete acid hydrolysis.

Most wellbores following conventional acid treatments experience a sharp decline in production. This may be attributed to the high reactivity of hydrochloric acid with the formation which will cause it to be spent rapidly near the wellbore and a short fracture will be created.

Other disadvantages of conventional acid fracturing are excessive tubing corrosion and associated high cost of acid inhibition and the tendency to form acid-oil sludge in asphaltene rich crude. This problem is particularly severe when the acid reaction rate is high, owing to high formation temperature.

The acid fluid-loss mechanism is more complex, owing to being a reactive fluid. In addition to leaking off into the formation, flowing acid leaks off dynamically by dissolving the rock and producing wormholes. Wormholes are very detrimental in fracture acidizing. They greatly increase the effective surface area from which leak off occurs and are believed to affect acid fluid loss adversely. Acid leaks off predominantly from wormhole tips rather than the fracture face. As wormholing and excessive leak off occur, the leak off rate exceeds the pump rate, and a positive net fracturing pressure cannot be maintained to keep the fracture open. At this point in the treatment, which may be as soon as 6 minutes after acid injection starts, the fracture extension slows or stops.

To overcome some these problems, a delayed solid acid injection was developed. In this method, the acid is injected in a solid form with the fracturing fluid. Upon the placement of this acid in the created fracture, the reactivity of the acid with the formation will be initiated once the right temperature is reached and required amount of water is available. These acids were envisioned as a viable alternative to create longer fractures. These acids are coated in a vegetable oil that keeps them from dissolving in water based fluids until the capsules start melting.

For example, once the solid acid hydrolyzes, acid is generated, then acid reacts with the filter cake, and any remaining hydrolyzed acid will react with the carbonate formation. In the wellbore, enough solid acid may be injected to react with carbonate material in the filter cake and additionally to react with the formation. The hydrolyzed acid performs a wellbore enlargement and/or fissure cleanout.

The solid acid starts as an inert substance under surface conditions but hydrolyzes into an acid under downhole conditions after a certain time, which is influenced by bottom hole temperature. This mechanism allows for a delayed reaction time.

Such processes, while useful, have problems caused by the solid acid not being completely hydrolyzed, causing gumming, formation of additional filter cake, and incomplete formation fracturing, and as a result the well may experience a sharp production decline.

SUMMARY

Embodiments herein are directed toward a test system and test methodology that may be used to accurately measure or otherwise characterize the onset and completion of hydrolysis at wellbore conditions.

In one aspect, embodiments disclosed herein relate to a method for testing solid acid hydrolysis in a formation. The method includes introducing a test sample into a test cell, wherein the test sample comprises an upper structure, a lower structure, and a solid acid disposed between the upper and lower structures; increasing a pressure of the test cell; increasing a temperature of the test cell; measuring a velocity of an acoustic p-wave and/or acoustic s-wave through the test sample while the temperature is increasing from an initial temperature to a final temperature; and determining a temperature of onset of solid acid hydrolysis based on the measured velocity.

In another aspect, embodiments disclosed herein relate to a method for characterizing solid acid hydrolysis in a formation. The method includes introducing a solid acid into a test cell between an upper wafer and a lower wafer; increasing a pressure of the test cell; increasing a temperature of the test cell; measuring one or more of an acoustic wave velocity, a displacement between the upper wafer and the lower wafer or a volume of fluid displaced from the test cell as the temperature is increasing from an initial temperature to a final temperature; and characterizing the solid acid hydrolysis based on one or more of the measured velocity, the measured displacement or the measured volume.

In yet another aspect, embodiments disclosed herein relate to a system for qualitative measurement of solid acid hydrolysis. The system includes a test chamber for receiving a test sample comprising a top wafer, a bottom wafer, and a composition comprising a solid acid therebetween; at least one piston for applying an axial stress to the test sample; an acoustic wave generator configured to generate and pass an acoustic wave through the test sample; an acoustic wave sensor configured to measure a property of the acoustic wave passed through the test sample.

Other aspects and advantages will be apparent from the following description and the appended claims.

DETAILED DESCRIPTION

As noted above, incomplete reaction during solid acid fracturing has been found to form gums or otherwise may be detrimental to well performance. Embodiments disclosed herein relate to a new testing methodology and system that has been devised to accurately measure and quantify acid hydrolysis under downhole conditions.

More specifically, embodiments disclosed herein relate to testing systems and methods in which an acoustic wave velocity through a solid acid sample is continuously measured as the temperature of the sample is increased. The test may thus emulate the performance of a solid acid downhole as the temperature of the injected fluids and solid acid is recovered back to reservoir temperature following the cooling effect of drilling fluid injection.

The acoustic (sonic p-wave) wave may be utilized to monitor the on-set of acid hydrolysis. As the temperature is increased, the solid acid degrades from a solid to a liquid, and the acoustic waves travelling through the solid acid test samples have been found to exhibit sharp increases in velocity. Accordingly, test systems and methods according to embodiments herein may provide vital data on the solid acid systems and their hydrolysis characteristics. Results of data obtained via systems and methods disclosed herein may be useful in preventing incomplete reaction downhole and in preventing the formation of the plastic-like materials that may damage the formation.

Figure 1:
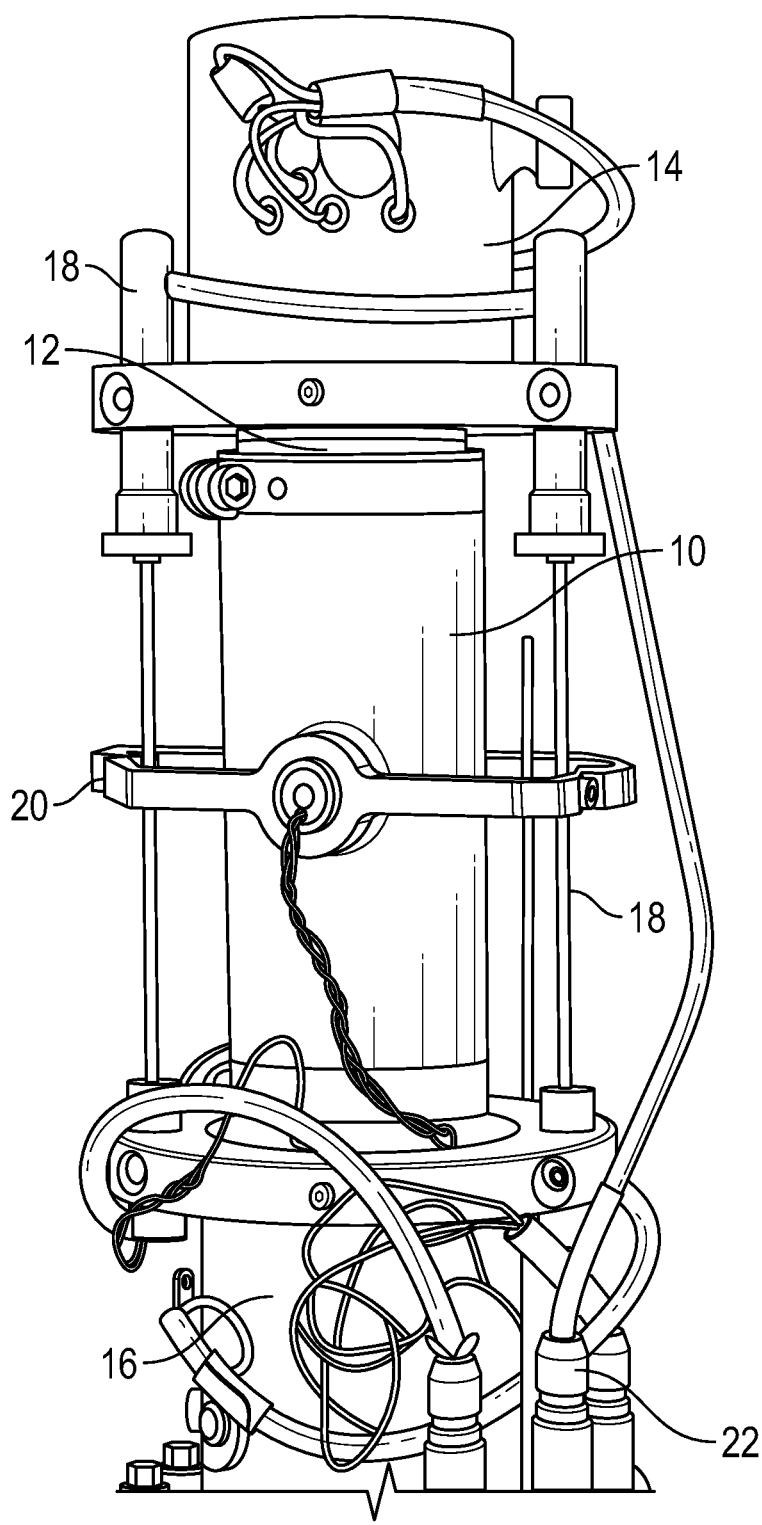
FIG. 1 is an illustration of a triaxial testing cell according to one or more embodiments disclosed herein.

Referring now to FIG. 1, a system for measuring solid acid hydrolysis characteristics according to embodiments herein is illustrated.

A system for qualitative measurement of solid acid hydrolysis, according to embodiments herein, may include a test chamber 10 for receiving a test sample (described further below, and which may include a top wafer, a bottom wafer, and a composition comprising a solid acid therebetween). The system may further include at least one piston for applying an axial stress to the test sample. For example, an upper piston may apply pressure (a downward pressing force) against an upper surface of the top wafer, and/or a lower piston may apply an upward force against a lower surface of the bottom wafer. The forces applied to the top and/or bottom wafers, for example, may emulate a closing pressure of the formation on any fractures in which a solid acid is injected during an acid fracturing process.

While not illustrated, systems according to embodiments herein may further include a heater or heating element configured to increase a temperature of the test chamber. The heater or heating element may be used to gradually increase a temperature of the wafers, solid acid, and fluid in the test chamber, emulating the temperature recovery process following injection of a fluid into a formation. For example, the heater may be an oven in which the test chamber is placed, and the heat may increase the temperature within the test chamber to about 120° C.

The system may further include an acoustic wave generator 14 configured to generate and pass an acoustic wave through the test sample. The system may also include an acoustic wave sensor 16 configured to measure a property of the acoustic wave passed through the test sample. For example, the acoustic wave sensor may include a velocity transducer, measuring a velocity of the acoustic wave after passing through the test sample. Continuous and/or intermittent measurement of the velocity, for example, may provide an indication of a change in the test sample, such as a phase change of the solid acid (dissolution of an encapsulant and/or hydrolysis of the acid, for example). Thus, the measurement of the acoustic wave velocity may allow characterization of the solid acid hydrolysis process. While illustrated in FIG. 1 as passing the acoustic wave vertically through the test sample, embodiments herein further envision passing the acoustic wave radially through the test cell. The acoustic wave sensor may be configured to measure one or more of a velocity, a compressional velocity, or a shear velocity of the acoustic wave passed through the test sample. Further, the system may provide velocity measurements through the sample by sending P-wave (compressional) and two S-waves (shear). The waves may be triggered, for example, from a transducer by polarized crystals that operate at frequency of between 500 kHz and 1000 kHz, such as 700 kHz.

The system to characterize solid acid fracturing may also include one or more position sensors 18 to configured to measure an axial displacement of one or more of the piston or the test sample. Similarly, one or more position sensors 20 may be provided to measure a radial displacement of the sample or test cell. The position sensors, for example, may measure a relative position of the test sample, and as the solid acid changes phase and hydrolysis occurs, the distance between an upper wafer and a lower wafer of the test sample may decrease. The measurement of the position of the samples may thus provide additional data useful for characterizing the solid acid hydrolysis and fracturing process.

The system may additionally include a flow control and measurement system 22. The flow control and measurement system may include flow control valves and flow sensors for controlling a flow of fluid to or from the test chamber, as well as for measuring a flow of fluid entering and/or leaving the test chamber. The flow control and measurement system may be used, for example, to provide a volume of water to the test cell, emulating wellbore fluid and providing water for hydrolysis of the acid. Further, as the hydrolysis occurs, and the distance between the upper and lower wafers decreases, a volume of fluid may be displaced from the test cell. The flow measurement devices may thus be used for monitoring the compression of the space between the wafers, similar to the closing of a fracture downhole.

This system may be designed such that axial stress may be applied mechanically by an axial piston while confining pressure may be applied hydraulically by an intensifier. The axial stress (pore pressure) applied to the system may be 1000 psia to 20,000 psia in some embodiments, from 5,000 psia to 15,000 psia in other embodiments, such as 10,000 psia. Confining pressure applied to the system may be in a range from 1,000 psia to 35,000 psia in some embodiments, from 15,000 psia to 25,000 psia in other embodiments, such as 20,000 psia. After applying the axial and radial stress, the axial and radial stress measurements may be measured by strain gauges or Liner Variable Differential Transducer (LVDTs), for example.

The test samples disposed within the test chamber, as alluded to above, may include a top structure, a bottom structure, and a composition including a solid acid disposed therebetween. The upper and lower structures may be in the form of wafers, for example, but other shapes may be used. Suitably, the size and shape of the wafers may be based on the size and shape of the test cell.

It is envisioned that acid fracturing may include injection of proppant and other materials into the formation, such as to hold the formation open during acid hydrolysis. Accordingly, the composition disposed between the wafers may include proppant, solid acid, weighting agents, and other components as may be commonly used during a solid acid fracturing process, such as accelerants or delaying agents, among others.

Such solid acid may be manufactured as solid particles enveloped by a water-soluble coating material. The coating of the solid acid can be engineered to obtain a range of release rate and release temperature profiles by altering either the coating composition, amount of coating, or the diffusional properties of the coating membrane. The coating may be designed such that the solid acid can be fully disposed downhole prior to the acid beginning to hydrolyze. Further, depending on the formation, the coating may be adjusted to be degraded at, or slight below, that formation temperature.

The solid acid composition tested may include, in some embodiments, an encapsulated acid. For example, various solid acid coating (encapsulant) materials may be used to encapsulate an acid, where as noted above, when the encapsulant changes from a solid to a liquid as the temperature increases, the acid is released. Polymers having a melting point above room temperature may be useful as encapsulants, including biodegradable and/or dissolvable polymers such as polylactic acid (PLA), polyglycolic acid (PGA), and other copolymers as described in U.S. Pat. No. 7,166,560, for example. In other embodiments, for example, the acid may be in the form of a solid acid precursor, such as an ester of an organic acid. For example, an acid may be provided in the form of an ester of an organic acid, for example, which may be solid at handling conditions but where the ester may hydrolyze under downhole conditions to release the acid. Other various solid acids may be tested using systems and methods according to embodiments herein.

The solid acid may be any organic compound that, when exposed to water, will produce an organic acid. As an example, an ester such as ethyl acetate, when exposed to water, will produce acetic acid as shown in the following equation:

$$CH_3COOCH_2CH_3 + H_2O \Leftrightarrow CH_3COOH + CH_3CH_2OH$$

Such a hydrolysis reaction will also act in reverse as an esterification reaction. This reverse reaction will occur if there is not sufficient water available to consume the ester. Therefore, injection of sufficient water may be necessary to prevent incomplete reaction, and achieve continuous organic acid generation to be spent in reaction with the carbonate rock.

The solid acid may be provided in the form of beads, fiber, chips, flakes, powder, or others. In some embodiments, the solid acid may be in the form of beads, such as spherical particles having an average diameter in the range from about 200 to about 1000 microns, such as from about 300 to 750 microns. In other embodiments, the particles may have an average diameter of 20 to 40 mesh. The specific gravity of the solid acid may depend upon the form and composition of the solid acid, and may be, for example, in the range from about 1.1 to about 1.5.

As the focus of the test method is on the hydrolysis of the solid acid, the material of construction of the wafers is not particularly limited. In some embodiments the wafers may be a steel, such as a stainless steel. In other embodiments, the wafers may be formed of a rock material. In some embodiments, the rock material may be similar in composition to that as may be encountered downhole during solid acid fracturing, such as a dolomite or carbonate containing rock sample, so as to additionally investigate the etching that may be achieved. Testing of the solid acid compositions in the above-described test apparatus may be performed, for example, using one or more of the following test methodologies.

In some embodiments, a method for testing solid acid hydrolysis in a formation may include introducing a test sample into a test cell. The test sample may include, for example, an upper structure, a lower structure, and a solid acid disposed between the upper and lower structures. The upper and lower structures may be as described above, and may be cylindrical wafers, for example, made of steel, rock, or other substrates suitable for testing with acid and at conditions simulating a wellbore environment (high pressure, elevated temperature). The solid acid disposed between the upper and lower structure may also be as described above.

Following disposition of the test sample in the test cell, the method may include increasing a pressure of the test cell. For example, the internal pressure of the test cell may be increased to simulate a wellbore environment, and may include increasing the pressure within the test cell up to pressures as high as or greater than 4000 psia. Simulating the wellbore environment, including pressure resulting from the column of drilling fluids as well as the closing pressure of the formation may provide a test result indicative of what may actually happen within a wellbore during solid acid fracturing processes.

The test method may further include increasing a temperature of the test cell. Disposition of the solid acid within the test cell, such as at room temperature, may emulate the temperature drop of the formation proximate the wellbore resulting from the injection of the fracturing and acidizing fluids into the formation. Increasing the temperature may thus simulate the gradual increase in temperature the fracturing and acidizing fluids may experience in a formation when flow is stopped and the well is shut in. Thus, increasing the temperature of the test cell may result in the solid acid breaking down (melting, dissolving, etc., depending upon the form of the solid acid), and water present within the test cell may initiate the hydrolyzing of the solid acid and reaction with the upper and lower wafers.

As the temperature is increased, methods according to embodiments herein may also include measuring a velocity of an acoustic p-wave through the test sample. For example, the velocity of the acoustic wave may be measured continuously while the temperature is increasing from an initial temperature, such as the temperature of a formation after the cooling effects of drilling fluid, to a final temperature, such as a closed in formation temperature. In some embodiments, intermittent measurement of the velocity may be sufficient. Due to the changing nature of the solid acid, reaction of the solid acid as well as changes in axial distances between the upper and lower structures that may result due to a phase change in the solid acid, the measured acoustic wave velocity may change as the temperature is increased and the reaction progresses. Based on the recorded velocities, a temperature of onset of solid acid hydrolysis within the test environment may be determined based on the measured velocity.

As the hydrolysis of the solid acid progresses, the acoustic velocity may be measured, and following completion of the reaction the acoustic velocity may stabilize. This may be a result of the phase change coming to completion (full melting or dissolution of the encapsulant, for example), as well as the closing of the distance between the upper and lower structures that may be permitted following the phase change. Methods according to embodiments herein may thus further include determining a temperature of completion of solid acid hydrolysis based on the measured velocity.

As noted above, the test apparatus may include pumps and flow lines for supplying a fluid to the test cell, such as a fluid emulating a fracturing fluid or a solid acid delivery fluid. Test apparatus according to embodiments herein may also include pistons or other means for applying a force to the upper and/or lower structures, as well as means to apply a radial force on the test cell/test environment. Increasing the pressure of the test cell according to embodiments herein may thus include increasing the pressure of the test cell by applying one or more of a fluid pressure, a radial stress, or an axial stress on the test sample.

Embodiments of methods disclosed herein may also include measuring one or more of a radial displacement and an axial displacement of the test sample. During the reaction, for example, the solid acid may change phases, allowing the upper and lower structures to move closer to one another. Further, the structures may react with the acid. The application of an axial force on the upper and/or lower structures may thus move the structures closer to one another. Measurement of the radial and/or axial displacement of the test sample, or corresponding associated portions of the test apparatus, such as a piston displacement, may thus provide another data point that may be used to fully characterize the solid acid hydrolysis and fracturing process. In some embodiments, a constant axial stress may be applied to the test sample.

Test methods according to embodiments herein further contemplate the desire to characterize multiple formation types, solid acid compositions, accelerants or inhibitors, as well as the use of proppants and other additives that may be used to more effectively keep a fracture open during the hydrolysis and acid fracturing process. Methods according to embodiments herein thus contemplate varying a composition of the solid acid and determining onset temperature and completion temperature of solid acid hydrolysis as a function of solid acid composition (solid acid type, solid acid encapsulant type, ratio of encapsulant to acid, etc.). Embodiments herein further contemplate using the test cell to determine onset and/or completion of hydrolysis as a function of acid loading, formation type, formation temperature, pressure, and other numerous variables that may be used to fully characterize the solid acid hydrolysis and fracturing process.

Methods according to embodiments herein may also include introducing and/or withdrawing fluid from the test cell. For example, an initial amount of fluid may be supplied to the test cell to simulate a relative volume of the fracturing or acid delivery fluid. The fluid may also be provided so as to provide sufficient water for the hydrolysis of the solid acid. Additionally, as the hydrolysis process occurs, and the upper and lower structures move closer together, a volume of fluid may be forced out of the test cell due to the decreasing volume (for example, a piston extending and pushing an upper wafer toward a lower wafer may displace fluid between the wafers). The methods herein may thus include, in some embodiments, one or more of introducing fluid into the test cell, withdrawing fluid from the test cell, measuring an amount of fluid introduced into the test cell, and/or measuring an amount of fluid withdrawn from the test cell.

Methods for characterizing solid acid hydrolysis in a formation according to embodiments herein may also include: introducing a solid acid into a test cell between an upper wafer and a lower wafer; increasing a pressure of the test cell; and increasing a temperature of the test cell. By measuring one or more of axial displacement, radial displacement, fluid volume displacement, temperature, pressure, and acoustic velocity, as the temperature is increasing from an initial temperature to a final temperature, the solid acid hydrolysis may be fully characterized. Characterization of the solid acid hydrolysis may include, for example, determining hydrolysis onset temperature, hydrolysis completion temperature, hydrolysis as a function of composition, proppant effectiveness in maintaining fractures open against closure pressure as the hydrolysis proceeds, as well as other variables that may be impactful to real-world application of the solid acid fracturing process.

EXAMPLES

A pressure cell as shown in FIG. 1 was used to simulate downhole conditions of stress (pressure) and temperature. A simulated amount of solid acid is sandwiched between two 1.5 inch diameter rock wafers (38 mm diameter). The amount of acid was determined based on the service-company recommendation of 0.5 lb per square foot of fracture-surface area (0.0024 $g/mm^2$). Therefore, the amount of solid acid used for the laboratory-scaled experiment was 2.765 g.

Following loading of the test sample into the cell, the test sample was situated inside the pressure cell, and the pressure cell was filled with distilled water and end-capped. The pressure cell was then placed inside an oven and the internal pressure was raised to 4500 psia. The pressure was applied by a hydraulically driven piston connected to one end of the pressure cell. The oven was closed and the temperature was raised to 260° F. (126.67° C.). The acoustic velocity was measured continuously as the temperature was raised. The system was then left for a specified time before the sample was unloaded and the effects of solid acid on the rock samples were observed for qualitative characteristics, such as solid acid hydrolysis and rock etching. The testing times were 4, 13, 24, and 48 hours. Two tests were conducted for each time to ensure repeatability.

Figure 2:
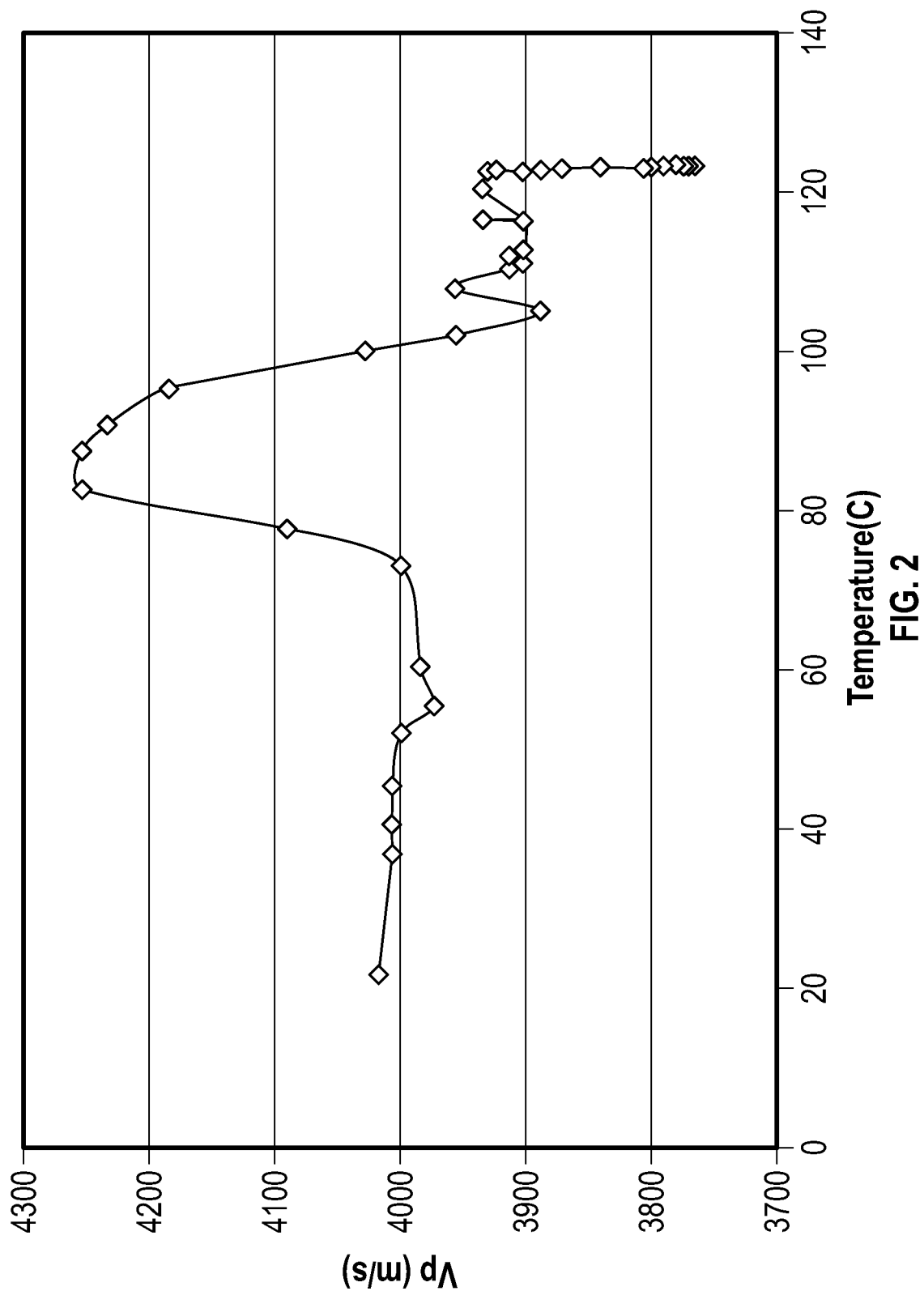
FIG. 2 is a graph of p-wave velocity versus temperature according to one or more embodiments disclosed herein.

The testing was used to determine the temperature at which solid acid hydrolysis gens (onset) and finishes (completion) as a function of the measured velocity. Based on the results of the test, acid hydrolysis can be characterized as a function of temperature, and the hydrolysis process of solid acid as temperature increases may be monitored by measuring the p-waves. The on-set of acid hydrolysis may then be established. FIG. 2 illustrated a graphical representation of the p-wave velocity as the temperature increases. As seen, once the temperature reaches approximately 72° C., a sudden increase in the compressional velocity is observed. This increase in velocity continues until the temperature reaches a value of approximately 80° C. This may indicate that the initial hydrolysis of the solid acid starts at about 72° C. and complete hydrolysis ends at about 80° C.

Figure 3:
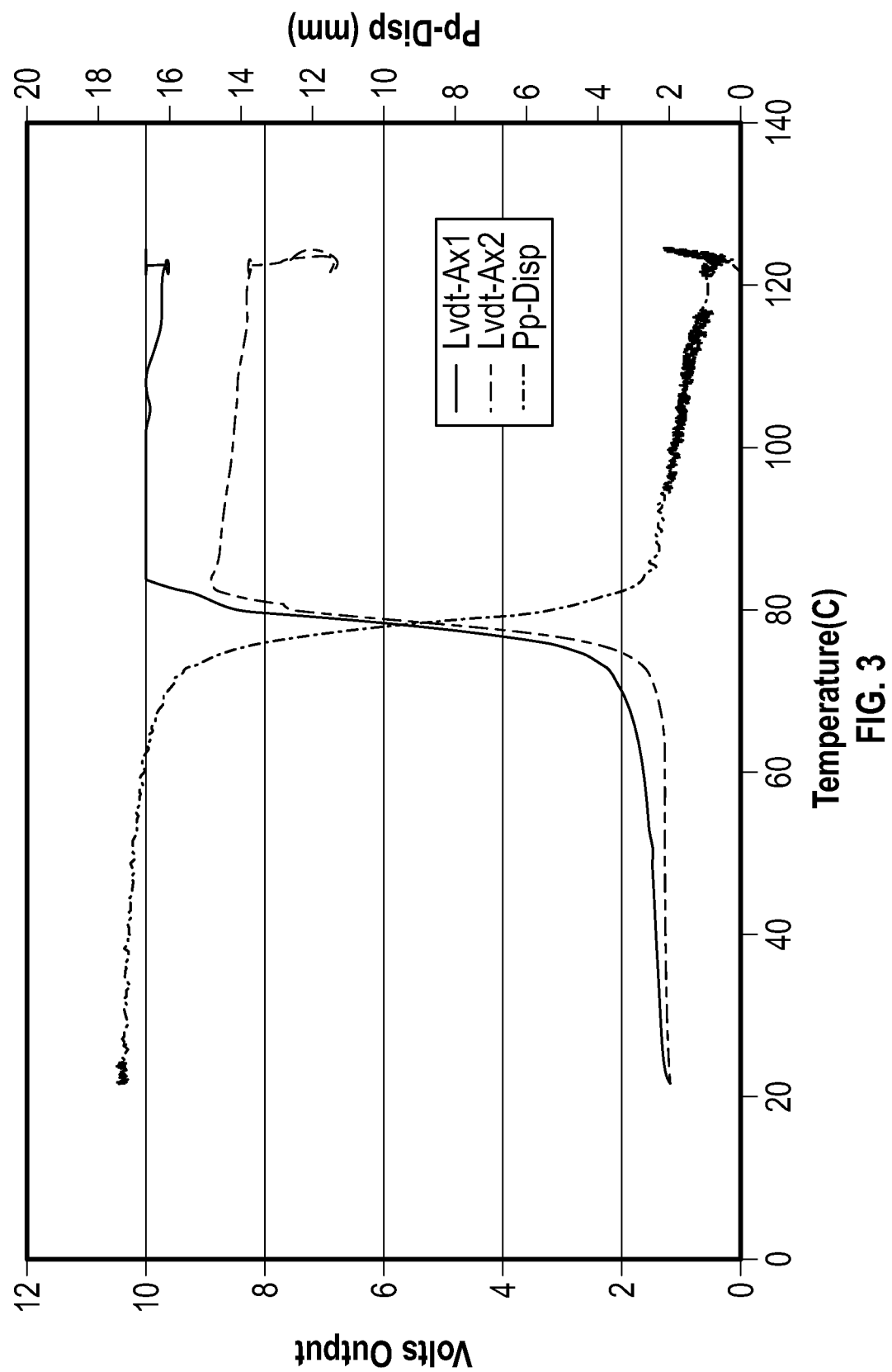
FIG. 3 is a graph of axial displacement and displaced fluid volume versus temperature according to one or more embodiments disclosed herein.

The position sensors positioned around the sample may also measure the change in the axial displacement. The increase in the output, measured in volts, of the position sensors indicates a decrease in the distance between the two wafers, which have the solid acid sandwiched between them. The change in the distance may indicate that the system no longer supports the axial load and therefore the wafers are in close contact, indicating that the acid has undergone a phase change from solid to liquid and the pressure has forced the liquid acid into the wafers. The decrease in distance is observed at a temperature of between 72° C. and 80° C., as illustrated in FIG. 3 (left axis represents the voltage output of the position sensors). As the distance between the wafers is reduced, the pore pressure increases and fluid is forced from the rock sample (pore pressure displacement (pp-disp) as shown on the right axis of FIG. 3).

As described above, methods and system for obtaining quantitative data regarding the hydrolysis characteristics of solid acid etching on rock samples from various formations has been developed. The methods and systems may use p-wave velocity measurements as a means for accurately and effectively determining one or both of hydrolysis onset temperature and hydrolysis completion temperature. Additionally, by testing different combinations of formations and solid acids, the solid acid may be engineered to obtain a range of release rates and release temperature profiles.

While the disclosure includes a limited number of embodiments, those skilled in the art, having benefit of this disclosure, will appreciate that other embodiments may be devised which do not depart from the scope of the present disclosure. Accordingly, the scope should be limited only by the attached claims.

What is claimed:

1. A method for testing solid acid hydrolysis in a formation, comprising:
    introducing a test sample into a test cell, wherein the test sample comprises an upper structure, a lower structure, and a solid acid disposed between the upper and lower structures;
    increasing a pressure of the test cell;
    increasing a temperature of the test cell;
    generating an acoustic p-wave and/or acoustic s-wave using an acoustic generator;
    measuring a velocity of the acoustic p-wave and/or acoustic s-wave through the test sample while the temperature is increasing from an initial temperature to a final temperature; and
    determining a temperature of onset of solid acid hydrolysis based on the measured velocity.

2. The method of claim 1, further comprising determining a temperature of completion of solid acid hydrolysis based on the measured velocity.

3. The method of claim 2, further comprising:
    varying a composition of the solid acid; and
    determining onset temperature and completion temperature of solid acid hydrolysis as a function of solid acid composition.

4. The method of claim 3, wherein the solid acid comprises an encapsulant and an acid, wherein the varying a composition of the solid acid comprises varying at least one of an encapsulant composition, an acid composition, or an encapsulant to acid ratio.

5. The method of claim 2, further comprising:
    varying an amount of the solid acid in the test sample; and
    determining onset temperature and completion temperature of the solid acid hydrolysis as a function of solid acid loading.

6. The method of claim 1, wherein increasing the pressure of the test cell comprises applying one or more of a radial stress or an axial stress on the test sample.

7. The method of claim 6, further comprising measuring one or more of a radial displacement and an axial displacement of the test sample.

8. The method of claim 6, wherein a constant axial stress is applied to the test sample.

9. The method of claim 1, further comprising generating the acoustic p-waves using an ultrasonic generator.

10. The method of claim 1, further comprising one or more of introducing fluid into the test cell, withdrawing fluid from the test cell, measuring an amount of fluid introduced into the test cell, or measuring an amount of fluid withdrawn from the test cell.

11. A method for characterizing solid acid hydrolysis in a formation, comprising:
    introducing a test sample into a test cell, wherein the test sample comprises an upper structure, a lower structure, and a solid acid disposed between the upper and lower structures;
    passing an acoustic wave generated by an acoustic wave generator through the test cell;
    increasing a pressure of the test cell;
    increasing a temperature of the test cell;
    measuring one or more of an acoustic wave velocity, a displacement between the upper wafer and the lower wafer or a volume of fluid displaced from the test cell as the temperature is increasing from an initial temperature to a final temperature; and
    characterizing the solid acid hydrolysis based on one or more of the measured velocity, the measured displacement or the measured volume.

12. The method of claim 11, further comprising determining a temperature of completion of solid acid hydrolysis based on one or both of the measured displacement or volume.

13. The method of claim 11, wherein the pressure is increased by applying an axial force to at least one of the upper wafer and the lower wafer.

* * * * *